United States Patent
Iizuka et al.

(10) Patent No.: US 6,196,360 B1
(45) Date of Patent: Mar. 6, 2001

(54) AUTOMATIC SHOE CLEARANCE ADJUSTMENT DEVICE FOR DRUM BRAKES

(75) Inventors: Yukio Iizuka, Nagoya; Kouji Moriwaki, Toukai, both of (JP)

(73) Assignee: Nisshinbo Industries Inc., Tokyo (JP)

( * ) Notice: Subject to any disclaimer, the term of this patent is extended or adjusted under 35 U.S.C. 154(b) by 0 days.

(21) Appl. No.: 09/093,656

(22) Filed: Jun. 9, 1998

(30) Foreign Application Priority Data

Jun. 11, 1997 (JP) ................................... 9-169536

(51) Int. Cl.[7] ................................... F16D 65/56
(52) U.S. Cl. ................................... 188/79.52; 188/196 BA
(58) Field of Search ................................... 188/196 R, 196 B, 188/196 BA, 196 D, 79.51, 79.63, 79.55, 79.52

(56) References Cited

U.S. PATENT DOCUMENTS

| | | | |
|---|---|---|---|
| 4,148,380 | * 4/1979 | Haraikawa | 188/79.5 |
| 4,385,681 | * 5/1983 | Conrad et al. | 188/79.5 |
| 4,390,086 | * 6/1983 | Conrad | 188/79.5 |
| 4,533,024 | * 8/1985 | Rath | 188/79.5 |
| 4,729,457 | * 3/1988 | Cousin et al. | 188/79.5 |
| 4,809,826 | * 3/1989 | Charbonnier | 188/79.52 |
| 5,295,561 | * 3/1994 | Le Moigne | 188/79.52 |
| 5,758,750 | * 6/1998 | Le Moigne et al. | 188/79.64 |

* cited by examiner

Primary Examiner—Robert J. Oberleitner
Assistant Examiner—Bradley King
(74) Attorney, Agent, or Firm—Arent Fox Kinter Plotkin & Kahn, PLLC

(57) ABSTRACT

An automatic shoe clearance adjustment device for a drum brake device which improves the ease of assembly of the bimetal member and prevents misassembly of the device. The adjuster 11 has a screw mechanism which automatically extends in response to the excessive opening of the brake shoes 2, 3. The bimetal member 15, which suspends the extension of the adjuster 11 according to the brake temperature increase, is provided between the parts constituting the adjuster 11. The bimetal member 15 is assembled together with and affixed to a non-rotating segment constituting the adjuster 11.

3 Claims, 6 Drawing Sheets

AUTOMATIC SHOE CLEARANCE ADJUSTMENT DEVICE FOR DRUM BRAKES

BACKGROUND OF THE INVENTION

This invention relates to an automatic shoe clearance adjustment device for a drum brake device equipped with an over-adjustment preventive measure which suspends the adjustment operation when the brake temperature rises.

In traditional automatic shoe clearance adjustment devices for a drum brake device, an opening action of the two facing plates of a folded bimetal member provided at the strut restricts the over-adjustment operation in case the brake drum expands as the brake temperature rises. One example is shown in Japanese Patent Publication Number Showa 58-49739.

Yet, in the above-described device, simply, a tube of the strut fits over the screw rod with a gap therebetween. Hence, until the strut is actually placed between the brake shoe and the hand brake lever and until the return spring is fitted, the strut could freely come out in the direction of that axle and could freely rotate.

Then, a rib of the folded bimetal member is structurally apt to come out from a triangle-like concave portion of the tube. For this reason, assembling the strut, in which the concave portion of the rib is interlocked, is said to be difficult.

If the strut is assembled while the rib is dislocated off from the concave portion of the tube, due to a large thrust force on the strut while the hand brake lever is in operation, the rib is deformed and may adversely affect the automatic adjustment operation which requires a delicate adjustment operation. Also, the same type of adverse effect may occur if the folded bimetal member rotates to interfere with other parts such as the shoe return spring. In addition, even if the misassembled parts are fortunately found, a correction of the misassembled parts demands effort and time.

OBJECTS AND SUMMARY OF THE INVENTION

This invention is designed to resolve the problems described above. To that end, an object of the invention is to provide a method to improve the ease of assembly of this bimetal member and to prevent misassembly, where a bimetal member is used as an over-adjustment preventive device which suspends the automatic adjustment operation of a clearance between the brake drum and the brake shoe when the brake temperature rises.

Another object of the invention is to provide an automatic shoe clearance adjustment device, wherein a bimetal member is movable in the direction of the adjuster axis with the stationary parts of the adjuster and is not relatively rotatable, thereby facilitating the assembling process and preventing misassembly.

Another object of the invention is to provide an automatic shoe clearance adjustment device, wherein the bimetal member is placed between the stationary parts of the adjuster, thereby improving the usability of the adjuster, increasing the ease of assembly, and preventing misassembly, if the worst should happen and the stationary parts are separated.

Another object of the invention is to provide an automatic shoe clearance adjustment device, wherein, from the above described advantages, the automatic shoe clearance adjustment operation between the brake drum and the brake shoe is accurately suspended when the brake temperature rises, thereby preventing over-adjustment.

In the first aspect of the invention, an automatic shoe clearance adjustment device for a drum brake device comprises an adjuster equipped with a screw mechanism for an automatic adjustment of the length of the adjuster in response to an excessive opening of brake shoes and a bimetal member provided between the parts constituting the adjuster. The bimetal member is provided to suspend the extension of the adjuster according to the brake temperature increase. In this invention, the bimetal member is connected together with an non-rotating segment which is a part of the adjuster.

In the second aspect of the invention, the bimetal member has a hook thereon and a cavity is formed in the non-rotating segment of the adjuster. The hook fits into the cavity. In this manner, the bimetal member is affixed to the non-rotating segment in the way that the bimetal member does not rotate about and does not come off from the longitudinal axis of the adjuster.

In the third aspect of the invention, the hook has a wider top portion and the cavity is specially shaped to receive the wider top portion. In this manner, the bimetal member is affixed to the non-rotating segment in the way that the bimetal member does not come off from the adjuster longitudinal axis.

In the fourth aspect of the invention, the bimetal member has an elastic hook, with the hook fitting locked with the non-rotating segment in a male-female contact. In this manner, the bimetal member is affixed to the non-rotating segment in the way that the bimetal member does not rotate about and does not come off from the adjuster longitudinal axis.

BRIEF DESCRIPTION OF THE DRAWINGS

The above and other objects and the attendant advantages of this invention will become readily apparent by reference to the following detailed description when considered in conjunction with the accompanying drawings wherein.

DETAILED DESCRIPTION OF PREFERRED EMBODIMENTS

Embodiment 1

A first embodiment of this invention is explained next with reference to the following figures.

Figure 1:
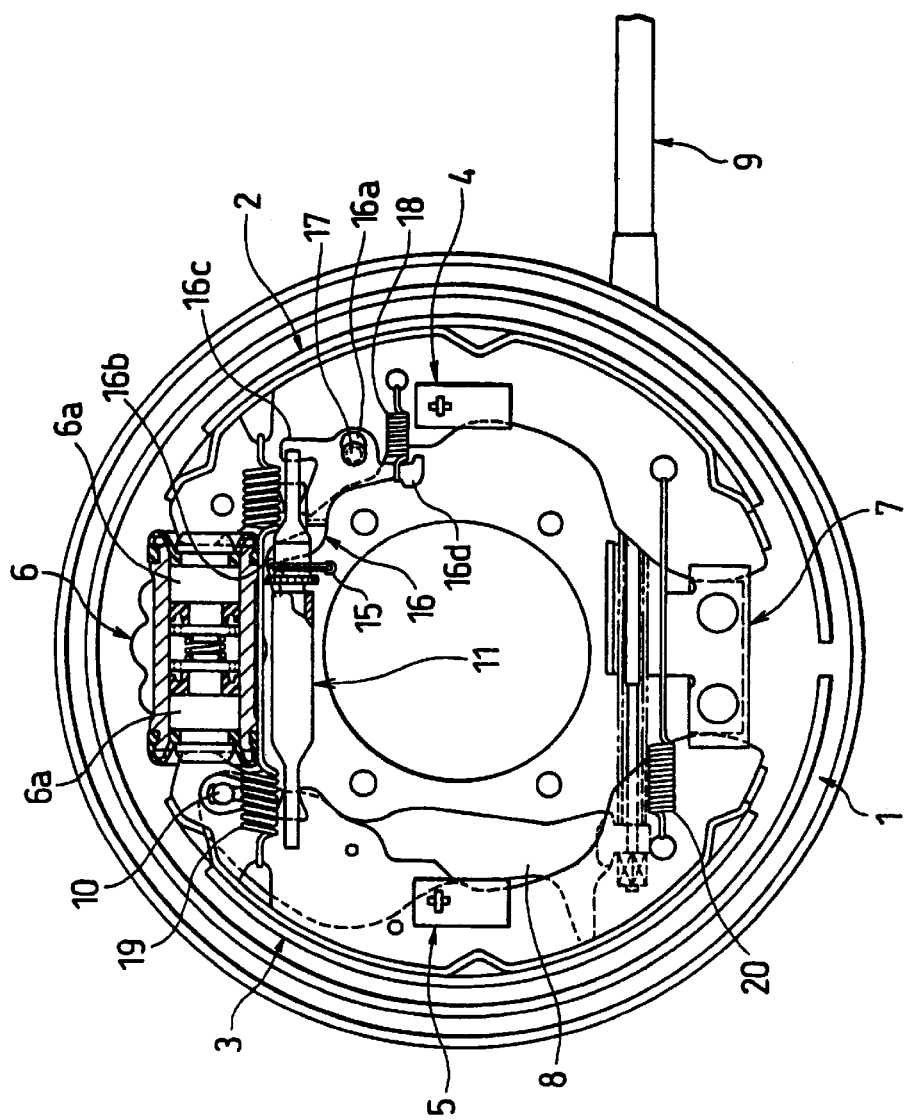
FIG. 1 is a structural plan view of the entire drum brake device which includes the embodiments of this invention.

A summary of the whole structure of the drum brake device is explained with reference to FIG. 1. The back plate 1 is affixed to the stationary part of the vehicle. The brake shoes 2, 3 are movably and elastically supported on the back plate 1 by the shoe hold devices 4, 5. The wheel cylinder 6 is an actuator, which operates upon activating the service brake, and is affixed on the back plate 1. The pistons 6a, 6a are positioned in the wheel cylinder 6 and respectively engage with the upper end of the brake shoes 2, 3. The anchor 7 is affixed on the back plate 1 and supports the lower ends of the brake shoes 2, 3. The brake lever 8 functions when the parking brake cable 9 is pulled. The pin 10 is placed on the upper part of the brake lever 8 so that the brake lever 8 is pivotally supported on the brake shoe 3 with the pin 10 as the fulcrum. The adjuster 11 is provided between the brake shoe 2 and the brake lever 8. The adjustment lever 16 is pivotally supported at its potbellied hole 16a by the pin 17 mounted on the brake shoe 2. The first to third arms 16b, 16c, 16d are formed at the adjustment lever 16. The first arm 16b engages with the toothed adjustment ring 12a; the second arm 16c abuts against the stepped surface of the socket 14. The adjustment spring 18 extends between the brake shoe 2 and the third arm 16d creating a counterclockwise force to the adjustment lever 16. The shoe return springs 19, 20, each extend between the brake shoe 2, 3.

Figure 2:
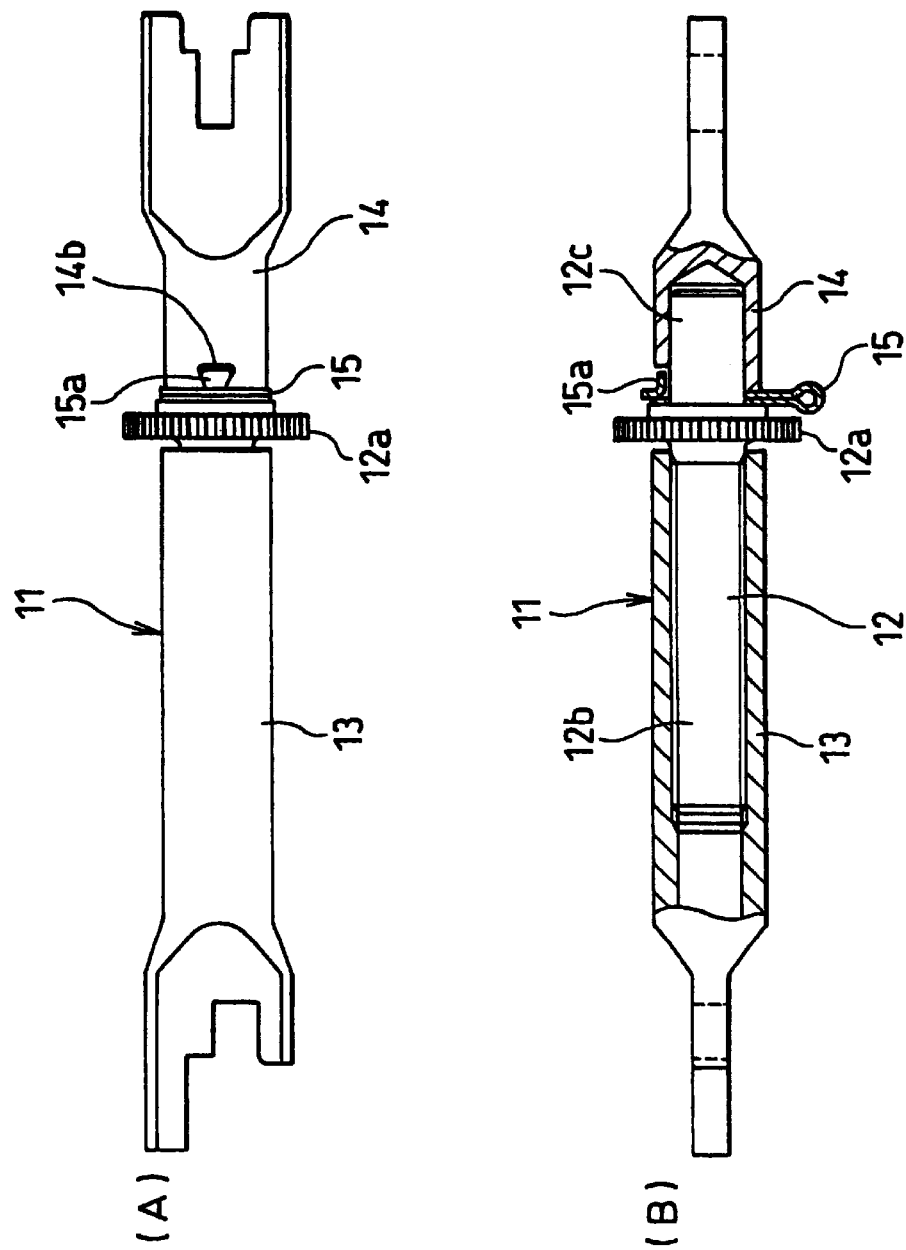
FIG. 2A is a lateral view and FIG. 2B is a partial cross-section plan view of the automatic adjuster in FIG. 1.
Figure 3:
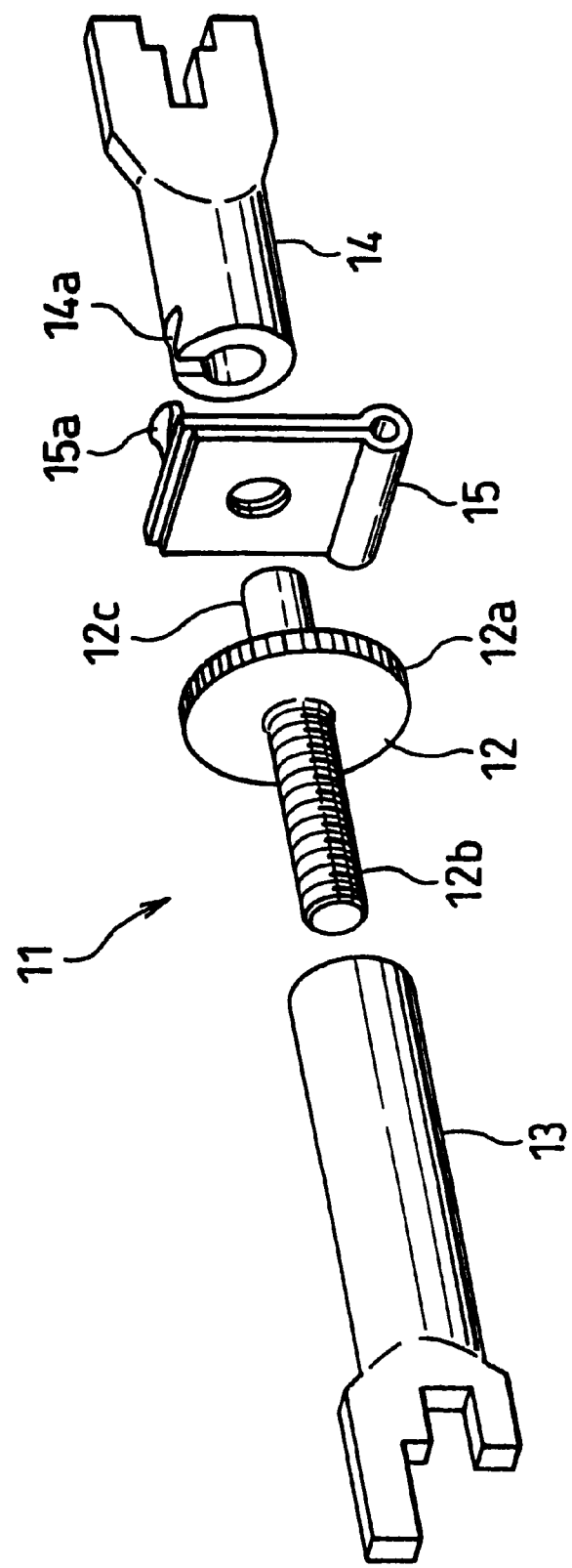
FIG. 3 is an analytical, exploded view of the automatic adjuster of FIG. 2.

As shown in the FIGS. 2 and 3, the adjuster 11, provided between the brake shoe 2 and the brake lever 8, comprises a bolt 12, a nut 13, a socket 14, and a bimetal member 15. The bolt 12 is equipped with the toothed adjustment ring 12a in a middle portion, the threaded portion 12b at one side of the middle portion, and the stem 12c at the other side. The threaded portion 12b of the bolt 12 is screwed into the nut 13. The notched groove at the left side of the nut 13 abuts against and engages with the brake lever 8. The socket 14 is smoothly fitted over the stem 12c of the bolt 12 in a relatively rotatable condition. The notched groove at the right side of socket 14 abuts against and engages with the brake shoe 2.

The bimetal member 15 is a folded plate having holes therethrough formed at the overlapped portion. The holes are sized to fit over the stem 12c with a gap. In this manner, the bimetal member 15 is positioned between the end surface of the toothed adjustment ring 12a and the end surface of the socket 14. The bimetal member 15 has a hook 15a with a wider top portion. The hook 15a is formed by bending the bimetal member 15 at the socket 14 side of the bimetal member 15 and has a deformed or shaped portion. The hook 15a fits into a shaped cavity 14a formed on the socket 14. The engagement of the hook 15a with the cavity 14a prevents the bimetal member 15 from rotating relative to the socket 14 and from moving axially of the adjuster 11. Thus, the bimetal member 15 is held rotationally stationary and is stationary with respect to the adjuster longitudinal axis.

In use, when the wheel cylinder 6 is pressurized by the service brake, the pistons 6a, 6a press the upper ends of the brake shoes 2, 3. This causes the brake shoes 2, 3 spread open with the point of abutment against the anchor 7 as the fulcrum to frictionally engage with the brake drum, not shown in the diagram, thereby creating a braking effect.

When the parking brake cable 9 is pulled, the brake lever 8 rotates counterclockwise with the pin 10 as the fulcrum to press the adjuster 11. This causes the brake shoe 2 spreads open with the point of abutment against the anchor 7 as the fulcrum to frictionally engage with the brake drum. Further, the brake lever 8 rotates with the point of abutment against the adjuster 11 to press the brake shoe 3 via pin 10. Accordingly, the brake shoe 3 spreads open with the point of abutment against the anchor 7 as the fulcrum to frictionally engage with the brake drum. In this manner, a vehicle parking brake is set.

When the service brake is activated to pressurize the wheel cylinder 6, the brake shoes 2, 3 spread open to abut against the brake drum. At this time, the adjustment lever 16 rotates counterclockwise by the force of the adjustment spring 18 with the pin 17 as the fulcrum, so that the adjuster 11 follows the brake shoe 3 and the brake lever 8. In addition, the pin 17 and the pivoting portion of the adjustment lever 16 move together with the brake shoe 2.

At this point, when the degree of opening of both brake shoes 2, 3 increases due to the wear of the lining of the brake shoes 2, 3, the degree of rotation of the first arm 16b of the adjustment lever 16 exceeds the pitch between two teeth of the toothed adjustment ring 12a to rotate the bolt 12. The threaded portion 12b of the bolt 12 screws out from the nut 13 to extend the effective length of the adjuster by a distance equal to only one tooth, thereby maintaining a constant clearance between the brake drum and the lining. At that time, the stem 12c of the bolt 12 rotates inside the socket 14.

Repeating braking, the brake drum temperature begins to increase causing the brake drum to expand. In addition, the folded portion of the bimetal member 15 may start to open to form a V-shape to increase the effective length of the adjuster 11, so that the automatic adjustment does not occur, thereby preventing overadjustment.

When releasing the brake, the adjuster 11 returns due to the spring force of the shoe return springs 19, 20. Therefore, no adverse effect is created.

In addition, when the parking brake is in operation, the adjuster 11, the adjustment lever 16, etc., moves with the brake shoe 2 because of the large thrust force on the adjuster 11. As a result, no automatic adjustment occurs.

A manufacturer may treat the adjuster 11 as an entire unit. For example, as shown in the FIGS. 2A, 2B and 3, the bimetal member 15 is actually structured together with the socket 14 unless the socket 14 comes off the bolt 12, thereby eliminating the problems of the conventional devices described above.

Embodiment 2

Figure 4:
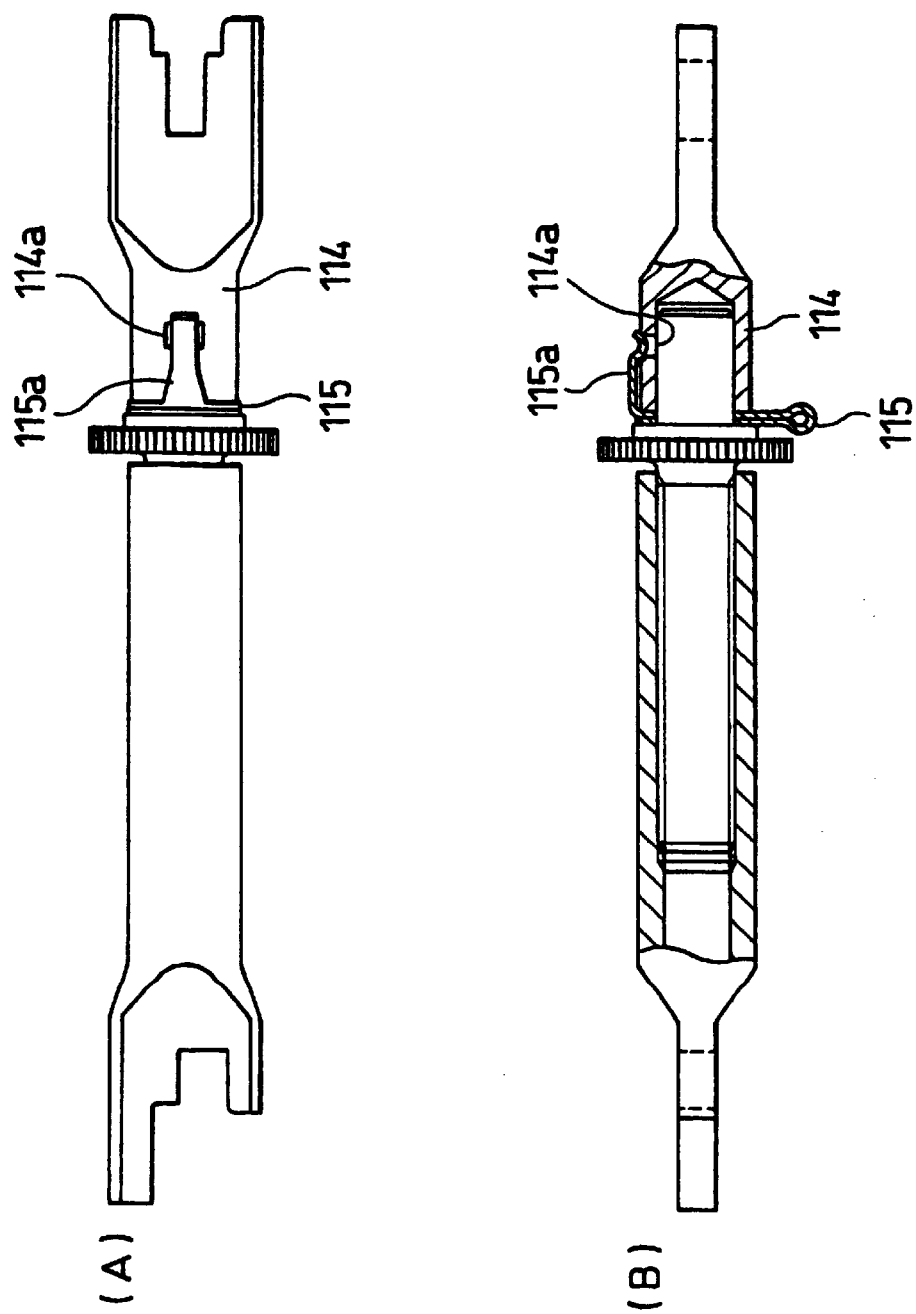
FIG. 4A is a lateral view.
FIG. 4B is a partial cross-section view of another embodiment of the automatic adjuster.
Figure 5:
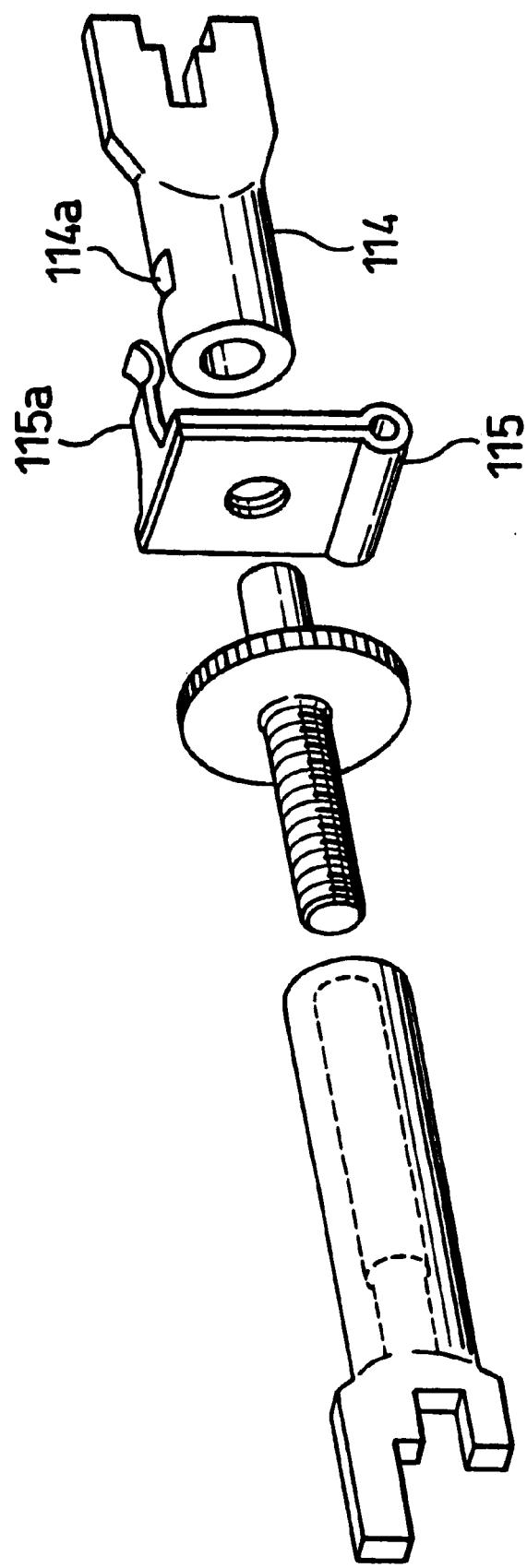
FIG. 5 is an analytical, exploded view of the automatic adjuster of FIG. 4.

A second embodiment of this invention is explained below with reference to the FIGS. 4A, 4B and 5.

In order to attain the same effect as the embodiment 1, the convex portion of the hook 115a of the bimetal member 115 is inserted into a rectangular hole 114a of the socket 114. The rectangular hole 114a could also be either a circular hole or a notched groove.

Embodiment 3

Figure 6:
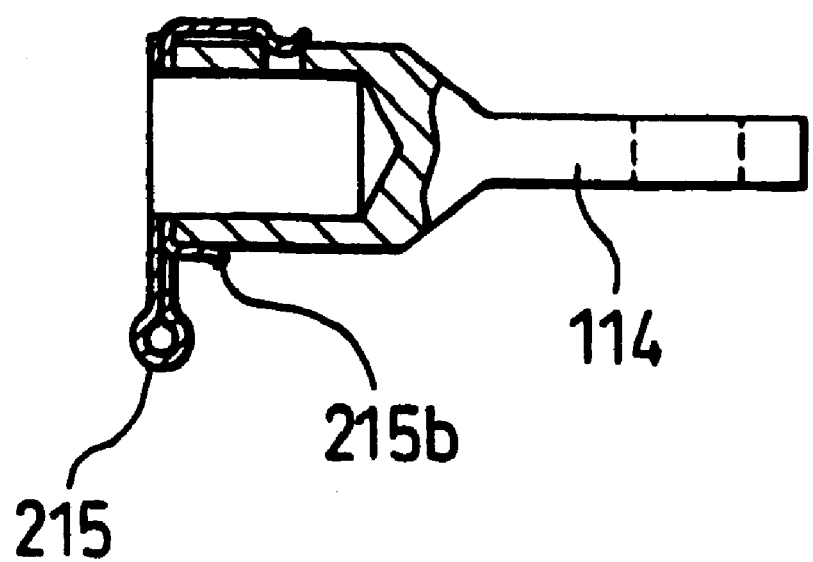
FIG. 6 is a structural view of assembling the bimetal member of yet another embodiment of the invention.

A third embodiment of this invention is explained below with reference to FIG. 6.

The third embodiment is a modification of the second embodiment, where the bimetal member 215 is structured with the socket 114. That is, the bimetal member 215 has a further deformed hook 215b formed by bending below as well as above the socket 114 in order to grasp or clamp the socket 114 between the two hooks 215a and 215b.

It is readily apparent that the above-described has the advantage of wide commercial utility. It should be understood that the specific form of the invention hereinabove described is intended to be representative only, as certain modifications within the scope of these teachings will be apparent to those skilled in the art. This invention is also available and applicable to the conventional adjuster. On the other hand, the structure of the drum brake device is not limited to the above-described structure but also available to various type of drum brake devices.

Accordingly, reference should be made to the following claims in determining the full scope of the invention.

What we claim is:

1. An automatic shoe clearance adjustment device for a drum brake device comprising:

an adjuster including a socket as a non-rotating segment and a screw mechanism having a screw-thread member for an automatic adjustment of a length thereof in response to an excessive opening of brake shoes, said screw-thread member having a toothed adjustment portion; and a bimetal member having a hook at an extended end thereof, said bimetal member sandwiched between the socket and an end surface of the toothed adjustment portion of said screw-thread member to suspend the length extension of said adjuster by separating said socket and said screw-thread member in response to the brake temperature increase, wherein said bimetal member is non-rotatable to and inseparable from said socket in a longitudinal direction of the adjuster and is non-rotatably connected to said socket by said hook.

2. An automatic shoe clearance adjustment device for a drum brake device as in claim 1, wherein said hook of said bimetal member has a wider top portion, and a cavity, designed and shaped to match said wider top portion, is formed in said socket, whereby said bimetal member is affixed to said socket by fitting said hook into said cavity.

3. An automatic shoe clearance adjustment device for a drum brake device as claimed in claim 1, wherein said hook has a projected top portion, a recess is formed on said socket, and said bimetal member is affixed to said socket by elastically engaging said projection with said recess.

\* \* \* \* \*